United States Patent [19]

Wood et al.

[11] 4,352,832
[45] Oct. 5, 1982

[54] STABILIZED DRESSING PRODUCTS

[75] Inventors: Robert W. Wood, West Milford, N.J.; John V. Parnell, Larchmont; Andrew C. Hoefler, Warwick, both of N.Y.

[73] Assignee: General Foods Corporation, White Plains, N.Y.

[21] Appl. No.: 278,281

[22] Filed: Jun. 29, 1981

Related U.S. Application Data

[63] Continuation-in-part of Ser. No. 135,738, Mar. 31, 1980, abandoned.

[51] Int. Cl.$^3$ ............................................. A23L 1/24
[52] U.S. Cl. ................................... 426/589; 426/613; 426/650; 426/330
[58] Field of Search ............ 426/589, 321, 330, 330.6, 426/330.1, 335, 532, 601, 605, 613, 638, 650, 654

[56] References Cited

U.S. PATENT DOCUMENTS

| | | | |
|---|---|---|---|
| 3,437,494 | 4/1969 | Loter et al. | 426/583 |
| 3,955,010 | 5/1976 | Chozianin | 426/605 |
| 4,145,451 | 3/1979 | Oles | 426/321 |

OTHER PUBLICATIONS

Levine and Fellers, "Action of Acetic Acid on Food Spoilage Microorganisms," J. Bact., Vol. 39, 1940.

Primary Examiner—Jeanette M. Hunter
Attorney, Agent, or Firm—Thomas R. Savoie; Daniel J. Donovan

[57] ABSTRACT

Dressing products which are bacteriologically-stable at room temperature and which possess a pH of at least 4.2 are prepared utilizing a relatively low level of acetic acid in combination with soluble buffering salts such as sodium acetate and/or sodium citrate. The acetic acid level of the dressing product wil be from about 0.2% to 4.0% by weight of the aqueous phase contained in the composition and the buffer salt level will be from about 0.4% to 3.0% by weight of the aqueous phase.

8 Claims, No Drawings

STABILIZED DRESSING PRODUCTS

This application is a continuation-in-part of Ser. No. 135,738 filed Mar. 31, 1980, now abandoned.

TECHNICAL FIELD

Conventional practice in the art of formulating salad dressing products, such as mayonnaise, creamy salad dressings (e.g., blue cheese, Thousand Island and creamy French) and the like, has been to employ relatively large quantities of acetic acid in order to render the formulation bacteriologically stable. Usually, sufficient acid is added to the formulation to bring the pH of the product below 4.0; however, the sour, tart taste of these products is perceived by many consumers as a flavor detriment, and the use of relatively large amounts of acetic acid makes these products costly to produce.

U.S. Pat. No. 3,955,010 to Chozianin et al discloses bacteriologically-stable, relatively low-acid dressing products containing from 0.45 to 1.8 percent acetic acid, based on the level of moisture present and requiring a low pH within the range of from 3.5 to 4.1. Additionally, these products limit the bacterial nutrient ingredients present in the dressing compostion to less than about 1% and also avoid and/or minimize the use of ingredients that would buffer the composition. In the absence of buffers, a low pH can be obtained with relatively small amounts of acid.

DISCLOSURE OF THE INVENTION

The products contemplated by the present invention are acetic acid-containing dressings which are commonly used as an adjunct on salads, vegetables, sandwiches, meats, pastas and the like. Products such as creamy salad dressings, mayonnaise, tomato-based barbecue sauces and tomato sauces are considered to be within the scope of this invention. These dressings may include oil or be oil-free and be pourable or spoonable. The products of this invention will possess a pH of at least 4.2, preferably at least about 4.3, and contain selected buffering salts in an amount of from 0.4% to 3% by weight of the moisture contained in the dressing product. These products will also contain a relatively low level of acetic acid (HAc) but be as stable to bacterial growth at room temperature (20° C.), less tart and less costly than conventional products of pH 4.0 and below. Usually the products will be formulated to achieve a pH of 4.5 or less, but higher pHs of 4.6, 4.7 or more could be stabilized.

According to the present invention, the soluble salts of acetic acid and citric acid, such as sodium acetate and/or sodium citrate are employed as buffering salts and function in the expected manner of increasing the pH of the dressing by shifting the dissociation equation $[HAc \rightleftharpoons H^+ + AC^-]$ to the left. It has been found, however, that contrary to the present belief of those skilled in the salad dressing art, the bacteriological stability of dressing compositions containing the same amounts of acetic acid can be improved at higher rather than lower pH levels. This effect is believed to be due to the increased level of HAc molecules.

Experiments were conducted to evaluate the effect of pH, and the level of acetic acid on the growth of *Lactobacillus brevis* (a common salad dressing spoilage organism) in acetic acid-containing model systems.

As conventional in the dressing art, the acetic acid and buffer salt levels expressed herein are in terms of percent by weight of the aqueous phase (i.e., weight of moisture present in the system).

In each of the four experiments set forth below, bacterial growth was evaluated after 5 days storage at 30° C., following an initial inoculation of 500 organisms per milliliter. Relative growth levels were measured using a Klett-Summerson colorimeter and standard analytical techniques.

A nutrient broth as set forth in Table 1 was employed in all experiments and for each experiment a standard colorimetric value, representing a relative percent transmission of light which passes through the sample, was obtained on the uninoculated broth prior to measuring the % transmission for the 5-day old inoculated samples. A lowering of the colorimetric value is indicative of an increasing level of microbial growth. Use of differing filters on the colorimeter used in the separate experiments resulted in different values for the identical nutrient broth standard.

EXPERIMENT #1

The effect of varying pH on bacterial growth in 100 mls. of the nutrient broth base in the absence of buffer salts but in the presence of equal amounts (0.1% each by weight of system) of standard anti-mold and anti-fungal agents is shown below. Percent transmission for the broth standard was measured as 22.5.

| pH | HAc (% by wt. of aqueous phase) | Vinegar (mls) (12.7% HAC) | K sorbate/ Na benzoate (% by wt.) | % Transmission (after 5 days) |
|---|---|---|---|---|
| 3.8 | 1.55 | 13.40 | 0.1 | 23.8 |
| 4.0 | 1.14 | 9.48 | 0.1 | 26.0 |
| 4.2 | 0.68 | 5.43 | 0.1 | 18.6 |
| 4.4 | 0.41 | 3.22 | 0.1 | 4.8 |
| 4.6 | 0.25 | 1.98 | 0.1 | 10.0 |

As would be expected by those skilled in the art, bacterial growth was supressed at pH 4.0 and below but growth was not controlled at pH 4.2 and above.

TABLE 1

| Nutrient Broth | |
|---|---|
| Ingredient | % (w/w) |
| Water | 95.385 |
| Bacto-proteous-peptone #3 | 1.000 |
| Bacto-beef extract | 1.000 |
| Bacto-yeast extract | 0.500 |
| Dextrose | 2.000 |
| Emulsifier (Tween-80) | 0.100 |
| MgSO$_4$ | 0.010 |
| MnSO$_4$ | 0.005 |
| | 100.000 |

EXPERIMENT #2

The effect of raising the pH by the addition of a 25% by weight solution of sodium acetate (NaAc) on bacterial growth in 100 mls. of the nutrient broth containing a constant amount of acetic acid is shown below. Percent transmission for the broth standard was measured as 24.0

| pH | HAc (% by wt. of aqueous phase) | Vinegar (mls) (12.7% HAC) | K sorbate/ Na benzoate (% by wt.) | NaAc (% by wt. of aqueous phase) | % Transmission (after 5 days) |
| --- | --- | --- | --- | --- | --- |
| 3.8 | 1.59 | 13.90 | 0.1 | 0 | 25.6 |
| 4.0 | 1.58 | 13.90 | 0.1 | 0.24 | 28.8 |
| 4.2 | 1.57 | 13.90 | 0.1 | 0.50 | 28.6 |
| 4.4 | 1.55 | 13.90 | 0.1 | 0.94 | 29.8 |
| 4.6 | 1.52 | 13.90 | 0.1 | 1.47 | 29.9 |

Surprisingly, it was found that at a constant level of HAc, and with pH levels of 4.2 and above brought about by the addition of a buffer salt, bacterial growth can be controlled.

EXPERIMENT #3

Experiment #1 was replicated with respect to the higher pH levels using a slightly different vinegar. Percent transmission for the broth standard was measured at 49.0.

| pH | HAc (% by wt. of aqueous phase) | Vinegar (mls) (12.5% HAC) | K sorbate/ Na benzoate (% by wt.) | % Transmission (after 5 days) |
| --- | --- | --- | --- | --- |
| 4.2 | 0.68 | 5.54 | 0.1 | 27.6 |
| 4.4 | 0.41 | 3.28 | 0.1 | 12.9 |
| 4.6 | 0.25 | 2.20 | 0.1 | 14.0 |

Again, it was found that at a pH of 4.2 and above bacterial growth was not controlled.

EXPERIMENT #4

Experiment #2 was replicated with respect to the higher pH levels using a slightly different vinegar. Percent transmission for the broth standard was measured as 50.1.

| pH | HAc (% by wt. of aqueous phase) | Vinegar (mls) (12.5% HAC) | K sorbate/ Na benzoate (mls.) | NaAc (% by wt. of aqueous phase) | % Transmission (after 5 days) |
| --- | --- | --- | --- | --- | --- |
| 4.2 | 1.57 | 14.18 | 0.1 | 0.50 | 40.0 |
| 4.4 | 1.55 | 14.18 | 0.1 | 0.94 | 44.8 |
| 4.6 | 1.52 | 14.18 | 0.1 | 1.47 | 48.8 |

Results were consistent with those found in Experiment #2, namely that increased stability can be obtained by raising the pH level and that buffer salt addition was effective to control bacterial growth.

EXPERIMENT #5

An experiment was conducted to determine the effect of acetic-acid both with and without an acetate buffer on the microbiological stablity of a tomato-based dressing. Each of the formulations, all of which are acceptable organoleptically, were heated to boiling, cooled, exposed to the air, and evaluated on a weekly basis for mold and other spoilage organisms. Formula A spoiled, as evidenced by visible mold and foaming, after one week; formula 3 spoiled, as evidenced by visible mold and foaming, after five weeks, and formula C was still stable after 20 weeks.

| | FORMULAS | | | | | |
| --- | --- | --- | --- | --- | --- | --- |
| | A | | B | | C | |
| Ingredient | (grams) | (%) | (grams) | (%) | (grams) | (%) |
| Water | 710.00 | 57.50 | 710.00 | 56.37 | 710.00 | 56.00 |
| Tomato Paste (27% solids) | 447.10 | 36.21 | 447.10 | 35.50 | 447.10 | 35.27 |
| Sucrose | 45.00 | 3.64 | 45.00 | 3.57 | 45.00 | 3.55 |
| Vegetable Oil | 11.00 | 0.89 | 11.00 | 0.87 | 11.00 | 0.87 |
| Salt | 10.00 | 0.81 | 10.00 | 0.79 | 10.00 | 0.79 |
| Minced Onions | 7.50 | 0.61 | 7.50 | 0.59 | 7.50 | 0.59 |
| Minced Green Peppers | 2.50 | 0.20 | 2.50 | 0.20 | 2.50 | 0.20 |
| Spices | 1.75 | 0.14 | 1.75 | 0.14 | 1.75 | 0.14 |
| Vinegar (12% HAc) | — | — | 24.70 | 1.96 | 24.70 | 1.95 |
| Sodium Acetate Trihydrate (about 60% NaAc) | — | — | — | — | 8.23 | 0.65 |
| pH | 4.03 | | 3.92 | | 4.43 | |
| HAc (aqueous basis) | 0% | | 0.28% | | 0.28% | |
| NaAc (aqueous basis) | 0% | | 0% | | 0.49% | |

The composition contemplated by the present invention may contain any of the ingredients heretofore employed in the dressing industry, some of which are indicated below.

Oil—the oil, if any, may be any of the well-known triglyceride oils, such as those obtained from oil seeds, and may be used at levels up to about 75% by weight.

Carbohydrate Materials—including sweeteners such as sucrose, fructose, glucose, corn syrup solids, etc., but also including hydrolyzed starch solids such as dextrins may be present in the formulation of this invention at a level of from about 5 to 40% by weight. It is also contemplated by this invention to utilize intensive sweeteners such as saccharin and dipeptides in place of sugars such as sucrose. In this event, the carbohydrate constituent of the dressing formulation will typically be non-sweet materials such as low D.E. dextrins, or, alternatively, non-carbohydrate bulking agents such as mannitol and sorbitol may be employed. As will be recognized by those skilled in the food art, ingredients such as tomato pastes and purees also include carbohydrate components which are bacterial nutrients.

Moisture—the moisture present both as added water and as a component of other ingredients (e.g., vinegar) will be present at from 20 to 90% by weight.

Egg Yolk—may be from whole eggs, whole egg powder, liquid egg yolk, dried egg yolk or the like and may be fresh or frozen. These materials may be present in the dressing product at levels ranging from 0 to 20% by weight.

Bodying Agent—typically materials such as starches and gums may be used alone or in combination at levels from 0% to about 7.0% by weight.

Chemical additives such as emulsifying agents, sequestering agents and agents such as sodium benzoate and potassium sorbate, to protect the dressing against the growth of certain yeasts and molds may be used. Flavoring agents such as natural and artificial flavors and various spices, relishes, tomato paste and/or puree, cheeses, etc. may also be employed in amounts which will be readily determined by those skilled in the art. Artificial and natural colors may also be included in the dressing formulations of this invention.

In accordance with the present invention, the dressing products contain acetic acid at a level of from 0.2% to 4.0% based on the weight of the aqueous phase of the product. In order to calculate the correct acetic acid level as will be appreciated by those skilled in the art, the amounts of acetic acid and water contained in all of the components of the dressing product must be taken into consideration. The preferred acetic acid levels for the products of this invention is from about 0.35% to 2.5%, 0.5% to 2.5% and 0.8% to 2.5% by weight of the aqueous phase. While acetic acid levels as low as 0.2% (aqueous phase) will improve the microbiological stability of dressing products to a point where they are stable against molds and resistant to other spoilage organisms found in the air over the reasonably intended product life of the dressing, acetic acid levels of at least 0.5%, preferably 0.8%, may be desired in order to obtain total microbiological stability.

The level of buffering salts contained in the dressing products will be from 0.4 to 3.0% based on the weight of the aqueous phase and preferably will be from about 0.6 to 2.0%. The buffering salts must also be present at a level sufficient to bring the pH of the dressing product to a pH level of at least 4.2 and preferably at least about 4.3.

By way of example, the formulation for a no-oil Thousand Island salad dressing is given below:

EXAMPLE 1

| Ingredient | Weight % |
|---|---|
| Water | 52.095 |
| Sugar | 17.095 |
| Relish | 10.819 |
| Tomato Paste (20.6% solids) | 6.491 |
| Whole Egg Powder | 5.410 |
| Salt | 3.246 |
| Vinegar (12% HAC) | 1.790 |
| Xanthan Gum | 0.649 |
| Propylene Glycol Alginate | 0.541 |
| Sodium Acetate (anhydrous) | 0.422 |
| Titanium Dioxide | 0.216 |
| Sodium Benzoate | 0.097 |
| Potassium Sorbate | 0.097 |
| Calcium Disodium EDTA | 0.006 |
| | 100.000 |

This formulation possessed a 33% solids content and was found to have a pH of 4.36 and a titratable acidity of 0.62. Based on the weight of the aqueous phase (67% of total composition) the acetic acid level was calculated to be 0.92% and the sodium acetate level was calculated to be 0.63%. The dressing composition was inoculated with a loading of 10,000 organisms per gram of mixed salad dressing spoilage organisms, including Lactobacillus, yeast and mold organisms, and the composition was found to be stable (less than 10 organisms per gram) after 20 weeks storage at room temperature.

A formulation for a no-oil blue cheese salad dressing is as follows:

EXAMPLE 2

| Ingredient | Weight % |
|---|---|
| Water | 41.858 |
| Dextrin (7 to 10 D.E.) | 21.500 |
| Vinegar (12% HAc) | 11.300 |
| Sugar | 5.000 |
| Salt | 3.500 |
| Whole Egg Powder | 2.000 |
| Blue Cheese Chunks | 10.000 |
| Sodium Acetate Trihydrate (60.3% NaAc) | 1.400 (0.84% NaAc) |
| Color | 0.845 |
| Flavor | 1.250 |
| Xanthan Gum | 0.550 |
| Propylene Glycol Alginate | 0.460 |
| Sodium Benzoate | 0.090 |
| Potassium Sorbate | 0.090 |
| Calcium Disodium EDTA | 0.007 |
| Mustard Flour | 0.150 |
| | 100.000 |

This formulation contained a 42% solids content, possessed a pH of 4.4 and a titratable acidity of 1.4. Based on the weight of the aqueous phase, the acetic acid level was calculated to be 2.41% and the sodium acetate level was 1.45%. This dressing formulation was also found to be bacteriologically stable during 20 weeks of room temperature storage after inoculation with a loading of 10,000 organisms per gram of mixed salad dressing spoilage organisms.

A formulation for a Mexican-style tomato sauce is as follows:

EXAMPLE 3

| Ingredient | Weight % |
|---|---|
| Water | 75.414 |
| Tomato paste (27% solids) | 12.398 |
| Vinegar (12% HAc) | 3.882 |
| Modified Tapioca Starch | 1.997 |
| Soybean Oil | 1.220 |
| Salt | 1.109 |
| Dry Minced Onion | 1.054 |
| Dry Green Pepper | 0.555 |
| Spices | 1.636 |
| Sodium Acetate (anhydrous) | 0.555 |
| Sodium Benzoate | 0.090 |
| Potassium Sorbate | 0.090 |
| | 100.000 |

This formulation possessed about a 13% solids content and was found to have a pH of 4.37 and a titratable acidity of 0.8. Based on the weight of the aqueous phase (about 88% of total composition) the acetic acid level was calculated to be 0.53% and the sodium acetate level was calculated to be 0.63%. This tomato sauce composition was inoculated with mold organisms at a level of 250 organisms per gram and the composition has remained stable, as evidenced by a measured mold count of less than 100 organisms per gram, for a period of at least 5 weeks at room temperature.

The present invention provides a useful and simple technique for the preservation of relatively high pH dressing products against bacteriological spoilage. Dressing products prepared in accordance with this invention are desirable from both a taste and cost viewpoint.

What is claimed is:

1. A room-temperature, bacteriologically-stable dressing product having a moisture content of between 20% and 90% by weight and a pH of at least 4.2 wherein the acetic acid content of the product is between 0.2% and 4.0% by weight of the aqueous phase and wherein the product contains buffering salts selected from the group consisting of the soluble salts of acetic acid, the soluble salts of citric acid and combinations thereof at a level of from 0.4% to 3.0% by weight of the aqueous phase.

2. The dressing product of claim 1 which contains carbohydrate materials at a level of from 5% to 40% by weight.

3. The dressing product of claim 1 wherein the pH is at least about 4.3.

4. The dressing product of claim 1 or 3 wherein the buffering salts consist of sodium acetate and sodium citrate.

5. The dressing product of claim 1 or 3 wherein the buffering salts consist of sodium acetate.

6. The dressing product of claim 1 wherein the acetic acid level is from 0.5% to 2.5 by weight of the aqueous phase.

7. The dressing product of claim 1 wherein the acetic acid level is from 0.8 to 4.0% by weight of the aqueous phase.

8. The dressing product of claim 1, 6 or 7 wherein the buffering salt level is from 0.6% to 2.0% by weight of the aqueous phase.